Aug. 6, 1968 G. W. MEEK 3,395,900

GAS AND LIQUID CONTACT APPARATUS

Filed May 9, 1967 2 Sheets-Sheet 1

INVENTOR.
George W. Meek

BY

Aug. 6, 1968   G. W. MEEK   3,395,900
GAS AND LIQUID CONTACT APPARATUS
Filed May 9, 1967   2 Sheets-Sheet 2

INVENTOR.
George W. Meek
BY
Attorney

United States Patent Office 3,395,900
Patented Aug. 6, 1968

3,395,900
GAS AND LIQUID CONTACT APPARATUS
George W. Meek, Fort Myers, Fla., assignor to Munters & Co., Stocksund, Sweden, a Swedish company
Continuation-in-part of application Ser. No. 549,764, Apr. 22, 1966. This application May 9, 1967, Ser. No. 637,252
Claims priority, application Sweden, June 10, 1966, 8,014/66
8 Claims. (Cl. 261—29)

ABSTRACT OF THE DISCLOSURE

A humidifier having a contact body which is generally referred to as a packing which is provided with a plurality of passages in which liquid flows by gravity in contact with air being passed horizontally therethrough by a fan. A plurality of troughs are mounted above the packing beneath liquid supply means and arranged to be tilted intermittently when the troughs become filled to a predetermined level to cause the water to be spilled out and flow downwardly through the passages and then automatically returned to its liquid receiving position.

---

This application is a continuation-in-part of abandoned application Ser. No. 549,764 filed Apr. 22, 1966, which was a continuation-in-part of application S.N. 292,643, filed July 3, 1963 and now abandoned.

Background

There are many commercial and industrial processes in which a liquid is evaporated into a gas or a gaseous mixture. For example, it is often desirable to add moisture to the air in a textile mill to reduce static electricity and to properly condition textile fibers for processing. In other instances, it is desirable to evaporate liquids into a stream of air or other gas, for treating a product to produce a chemical reaction.

Another common use of gas and liquid contact apparatus is to cool or humidify a stream of air by evaporating water therein to air-condition an enclosure. Such air-conditioning units are known as evaporative coolers, swamp coolers, desert coolers, etc. and are in common use in arid areas to cool the hot dry air by merely evaporating water thereinto.

The water is usually distributed over the top of a packing and it flows therethrough by gravity and a stream of air is blown through the packing which evaporates the water. As the water evaporates, part of the sensible heat in the air is converted to latent heat which reduces the temperature of the air.

Furthermore in many localities the water from the water supply systems contains mineral salts, algae and other solid particles which during the evaporation process tend to form a deposit on the surfaces of the contact body which might plug the passages therein unless removed. This becomes a problem in particular at the air inlet face of the contact body where the evaporation of the water is so rapid that the amount of evaporated water is substantially equal to the amount of water supplied. This problem is increased by the fact that these wetted portions pick up dust and other minute particles carried by the air stream and the surrounding atmosphere.

It is, therefore, among the objects of the invention to effectively counteract the tendency to form such deposits by a forceful supply of water and a thorough flushing of the passages in the packing.

Another object is to use a packing material which has a large moisture absorption capacity and is sufficiently bibulous to prevent or minimize the possibility of the packing becoming dry during the rapid evaporation of water.

A further object is to provide an improved humidifier which will reduce the quantity of water flowing through the packing while still providing sufficient and forceful flow to flush away dust, dirt and other deposits which have been accumulated in the passages.

A still further object is to provide a gas and liquid contact body which will preclude or minimize water losses by reducing or eliminating the tendency of droplets of water to drift along with the air stream at the air outlet side of the packing.

In terms of broad inclusion, the invention contemplates an arrangement by which the passages in the packing or contact body may be intermittently and richly wetted and flushed by the water supply and which provides controlled means for varying the saturating capacity or humidifying efficiency of the humidifier.

Further objects and advantages inherent in the invention will become apparent from the following specification given with reference to the accompanying drawings which describe and show a preferred embodiment of the inventive concept.

Summary of the invention

Figure 1:
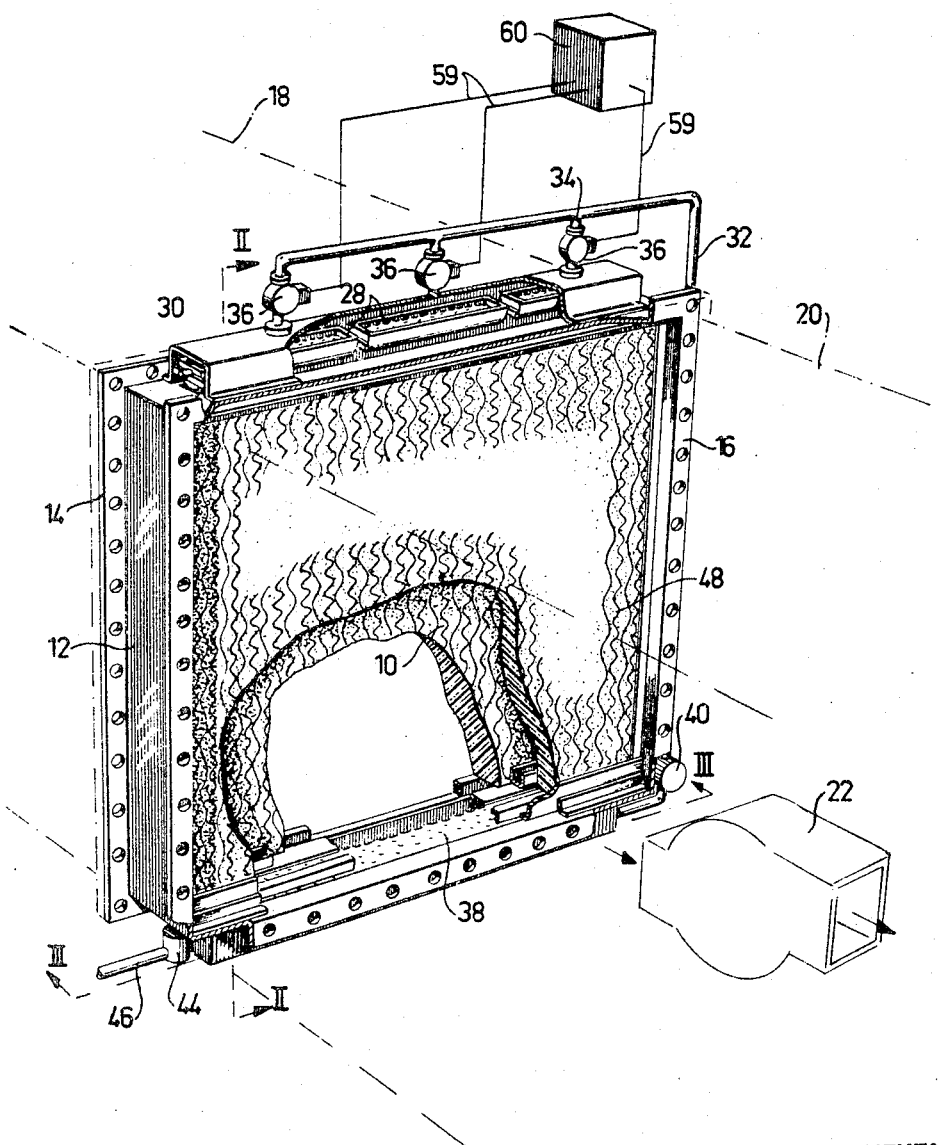
FIG. 1 is a perspective view of a humidifier according to the invention with portions broken away.

Referring more specifically to the drawings the reference numeral 10 indicates a packing or contact body mounted in a supporting frame 12, which is provided with flanges 14 and 16, adapted to be connected to an air conduit, which is indicated in phantom by broken lines 18 and 20. The air is drawn horizontally through the packing by means of the fan 22 which may be located adjacent the outlet face of the apparatus.

The contact body or packing 10 is composed of a plurality of facially opposed corrugated sheets 24 with the corrugations or adjacent sheets crossing one another. These sheets are made of moisture absorbent or bibulous material such as cellulosic or asbestos paper, and preferably are impregnated with a substance such as phenol or melamine resin or a water soluble phosphate. The impregnation is calculated to give the paper sheets the desired wet strength while still maintaining their bibulous characteristics. The sheets 24 are positioned substantially vertical and their surface extension corresponds substantially to the direction of the air flow 26. It will be noted that the packing or contact body has a greater vertical extension, as well as being wider than the thickness of the body in the direction of the air flow. By way of example, the thickness of the body in the direction of air flow 26, under normal operating conditions, may range between 50–150 mm.

Mounted above the top edge of the frame 12 are means for supplying water to the packing, which in the embodiment shown comprise a plurality of troughs 28 arranged in sequence. These troughs are mounted to be individually tilted on their rocker arms 30. The troughs are shaped relative to their respective rocker arms so that when they become filled with water to a predetermined level, the weight of the water will cause them to tip and spill the water whereupon they automatically are returned to their starting position. The water is supplied by the pipe 32 which has branches 34 directed towards the individual troughs, each of which branch pipes is provided with a valve 36. These valves can be operated to vary the number of troughs in operation. Thus, according to the invention the water supply means such as the troughs 28 are continually supplied with water, but is only intermittently spilled over the top face of the packing in relatively large dosages.

Beneath the conatct body 10 is a sump 38 for collecting the surplus water which is not evaporated. This surplus water is returned to the troughs 28 through the pipe 32 by means of the pump 40. The float 42 controls the valve 44 to the water supply line 46 so that the water in the sump 38 is maintained at a desired level. Thus, when the water has dropped below the predetermined level, the float 42 opens the valve 44, for a fresh supply of water. A funnel 45, which catches a portion of the water which runs down the contact body, is connected to a drainage pipe 47. It will be noted, therefore, that more water than that which is evaporated in the air is always supplied to the apparatus with the result that the concentration of solid substances in the water is kept at a low level.

A so-called drift eliminator 48 is arranged in spaced parallel relationship to the contact body 10 at the air outlet side thereof. This has a narrower thickness than the contact body, but may otherwise have the same structure and composition. This eliminator catches droplets of water which are splashed out from the air outlet side of the contact body by the air stream. The water caught by this drift eliminator is returned to the sump 38 through the vent 50.

The described structure comprising facially opposed corrugated sheets forming a plurality of criss-crossing passages, causes the air stream to change direction repeatedly during its passage through the contact body, with resultant high moisture pick-up ratio per surface unit of the sheet material and per unit of volume of the contact body. The contact body, therefore, becomes very compact. The moisture absorbent or bibulous characteristics of the paper material renders the entire sheet effective as an evaporative surface and makes possible intermittent washing with intervals from some tenths of seconds up to several minutes, without risk of the paper becoming dry or of any substantial increase in the degree of concentration of mineral salts, etc. Each time the trough is emptied, the underlying portion of the contact body receives a rich, momentary, supply of water so that the surfaces are thoroughly flushed and the water pouring down the surfaces will minimize any concentration of mineral salts and other solid particles. The forceful flushing also washes away any dust which might have become collected on the surfaces.

While the invention provides a very effective flushing, the humidifier nevertheless requires very small amounts of water for its operation in addition to that which is evaporated. As indicated above, the bibulous characteristics of the paper material is a contributory factor whereby the intervals between the washings may be extended. Besides, the quantity of water required for each washing is small, which results from the structure of the contact body. The criss-crossing passages exert an arresting effect on the water during its downward flow through the contact body resulting in the formation of thick film or even in a column of water substantially filling the interstices between the sheets, which momentarily entirely or partially block the respective passages. The passages by reason of their configuration also cause the water to course and diffuse in a horizontal direction across the contact body so that the water, which is supplied over a limited top area of the packing, is rapidly spread over the entire cross-sectional area of the contact body.

Capillary forces or the surface tension of the water tend to bridge or plug the terminal of the passages at the air inlet and air outlet faces of the contact body. The relatively slow-running water also has the effect of minimizing or precluding splashing or drift of water droplets carried by the air stream. Of importance for the proper distribution of the water over the contact body is also the fact that it is composed of sheets which extend principally in vertical direction so that the water which flows down through the space between two sheets is confined therebetween during its generally downward course through the packing. Thus, spreading of water in a horizontal direction, cross-wise or perpendicularly to the direction of the air flow is prevented which would reduce the amount of water in each cross-sectional area of the part to be washed or flushed. The compulsory restricted flow of the water results in a thorough flushing even if the contact body should be substantially high, i.e. vertical extension, such as in the range of one or several meters.

In order to obtain favorable flow conditions for both air and water, the height of the corrugations should be adequately proportioned. If the height of the corrugations is too small, the water will tend to remain in the passages in such quantity that it will form an undesirable barrier in the cross-sectional area thereof against the flow of air. Too high corrugations, on the other hand, would require a long contact body in the direction of air flow in order to produce the desired humidification and the consequent greater quantities of water which are needed for each washing enhances the risk of splash. A height between 2–9 mm. of the corrugations has shown to be desirable for producing adequate washing or flushing with very limited quantities of water. In many instances, the amount of water could be reduced to such an extent that recirculation thereof becomes unnecessary, and freshly supplied water could be used without any substantial drain on the water consumption. In many installations, where the circumstances put great demands on the purity of the water and the humidified air from a hygienic and medical point of view, it is desirable to avoid recirculation.

Figure 2:
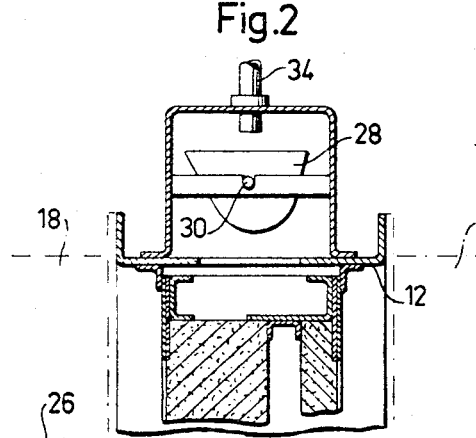
FIG. 2 is a section along the line II—II of FIG. 1.
Figure 4:
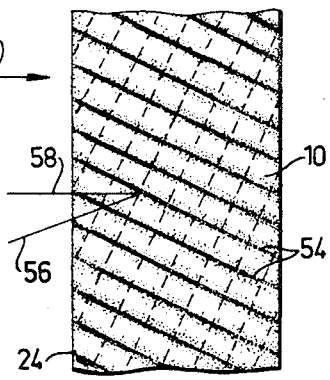
FIG. 4 is a fragmentary side elevational view of the packing or contact body.
Figure 5:
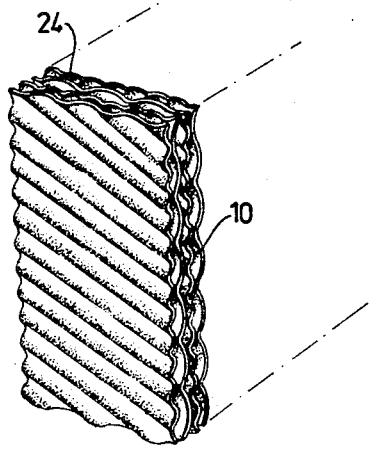
FIG. 5 is a fragmentary view in perspective of the packing.
Figure 3:
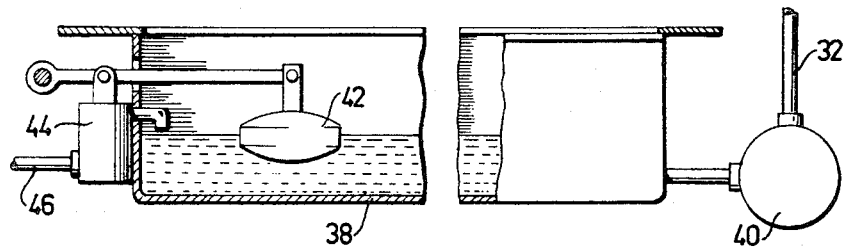
FIG. 3 is a sectional view taken along the line III—III of FIGS. 1 and 2.

As appears particularly from FIG. 4, the angle of inclination of the corrugations 52 which point upwardly as seen in direction of the air flow indicated by the arrow 26, of one set of sheets, is greater than the corrugations 54 of alternate sheets, which point downward. Thus, as shown in FIG. 4, the bisector 56 to the lines 52 and 54 will have a downward slant relative to the horizontal line 58. The air will carry along the downwardly running water in the direction of air flow which might have the result that the lower left corner of the contact body as seen in FIG. 2 will receive a lesser water supply than the other parts of the contact body. In other words, the water will be blown aside.

As the evaporation of water is most intensive at the air inlet side of the packing, where the air has the lowest relative humidity, it becomes important that these portions should be kept well flushed. Mineral particles, as well as dust, show the greatest tendency to accumulate at this position. The tendency of the water being blown at an angle is counteracted by the steep slant of the corrugations 52 which creates a flow component in the water in a direction toward the air inlet side. The angle or slant of the corrugations should be so selected that the water flow is satisfactorily balanced against the maximum air speed for which the humidifier is constructed. Too much of a slant, however, should be avoided in order to minimize the risk of splash on the upstream side at lower velocities. A slant or angle of the bisector of about 20° to the horizontal plane has proved to produce an undisturbed flow at velocities up to 3.5 m. per second.

During the time it takes the downwardly running water to reach the sump 38 after the trough has been dumped, a partial strangulation takes place in the air passages. Therefore, the troughs, at least during the predominant period of time, can be emptied at different moments of time, in order to prevent several portions of the contact body becoming choked-up at the same time. This can be done, for example, by giving the troughs somewhat different capacities, or by supplying them with somewhat different quantities of water so that their dumping frequencies will differ.

By shutting off the supply of water to a trough 28, the underlying portions of the contact body become ineffective for humidification or cooling. The air flows, as before, through the entire frontal area of the contact body, but contacts only the wetted surfaces beneath those portions where the troughs are still operating. It should be understood that those portions which are in function should always receive full water supply in order to prevent mineral scale deposit. By varying the wetted volume of contact body, the degree of humidification or cooling produced by the air can be regulated at will without having to employ any bypass and without substantially changing the pressure drop. Thus, the total air flow may be maintained constant at the predetermined rate. The valves 36 or other regulating means for supplying the water may be controlled by magnets actuated by a hygrostat 60 through the circuits 59, and which serves to maintain the desired degree of humidity in the room by regulation of the valves 36.

It should be understood that the foregoing specification is given by way of example and not by way of limitation. The invention may be given a variety of expressions within the scope of the following claims.

What is claimed is:

1. A humidifier for air comprising a corrugated contact body provided with a multiplicity of passages extending in vertical as well as in horizontal directions, and in which air and water flow in contact with one another, the air flow being substantially horizontal and the water flow being substantially vertical, the contact body having a greater vertical extension than the width in the direction of airflow, water supply means disposed above the contact body and including at least one tiltable water collecting trough, and regulatable means for intermittently causing the tilting of the trough in a manner to empty said trough onto the upper end of the contact body and cause the contents of the trough to pass downwardly through the upper edge part of the contact body, which edge is disposed directly below the trough.

2. A humidifier according to claim 1 in which the water supply means are adapted to vary the size of the wetted volume of the contact body while maintaining the area passed by the air flow constant.

3. A humidifier according to claim 2 having humidity responsive valve means for restricting the supply of water to a selected number of said troughs.

4. A humidifier according to claim 1 in which the contact body comprises a plurality of facially opposed corrugated sheets of bibulous material extending in a direction substantially parallel to the direction of air flow, the corrugations in each of said sheets extending at an angle to the horizontal and the corrugations in alternate sheets crossing the corrugations in intermediate sheets.

5. A humidifier according to claim 4 in which the corrugations pointing upward from the direction of the air stream have a greater angle to the horizontal than the angle of the corrugations in the intermediate sheets.

6. A humidifier according to claim 4 having drift eliminator means mounted at a spaced distance from the air outlet end of the contact body to prevent splashing of water droplets from said air outlet end, said drift eliminator means comprising a structure substantially identical with said contact body.

7. A humidifier for air having a contact body provided with a multiplicity of passages in which air and water flow and are brought into direct contact with one another, the body having a greater vertical extension, as well as being wider than the thickness of said body in the direction of the air flow, the air flow being substantially horizontal, the body having vertical passages for the flow of water, and means regulatable to provide for the constant supply of water to a wetted zone of the body, the water supply means being disposed above the contact body, said water supply means having a plurality of water troughs mounted for independent pivotal water-pouring movement, and means for selectively controlling the water flow into one or another of said troughs whereby the water supply to one or more of the troughs can be shut off so that only a portion of the contact will be wetted upon the pivotal water-pouring movement of the water-supply troughs.

8. A humidifier according to claim 7, wherein the water troughs are mounted upon a rocking, horizontal shaft that upon its rocking movement deposits water from the troughs on the contact body when a predetermined quantity of the water fills the troughs, the water supply means having a separate branch for the filling of each trough, and valve means for controlling the water flow through each branch and permitting the flow through each branch to be controlled.

References Cited

UNITED STATES PATENTS

| 2,431,389 | 11/1947 | Fleisher | 261—97 X |
| 2,486,138 | 10/1949 | Feinberg | 261—97 X |
| 2,502,137 | 3/1950 | Fleisher | 261—94 |
| 2,587,130 | 2/1952 | Feinberg | 261—98 X |
| 2,670,941 | 3/1954 | Feinberg | 261—97 X |
| 2,932,361 | 4/1960 | Beringer | 261—97 X |
| 3,243,166 | 3/1966 | Osenga et al. | 261—23 |
| 3,262,682 | 7/1966 | Bredberg | 261—112 X |

HARRY B. THORNTON, *Primary Examiner.*

TIM R. MILES, *Assistant Examiner.*